No. 730,408. PATENTED JUNE 9, 1903.
J. C. SKINNER.
BANANA SWING.
APPLICATION FILED FEB. 19, 1903.
NO MODEL.
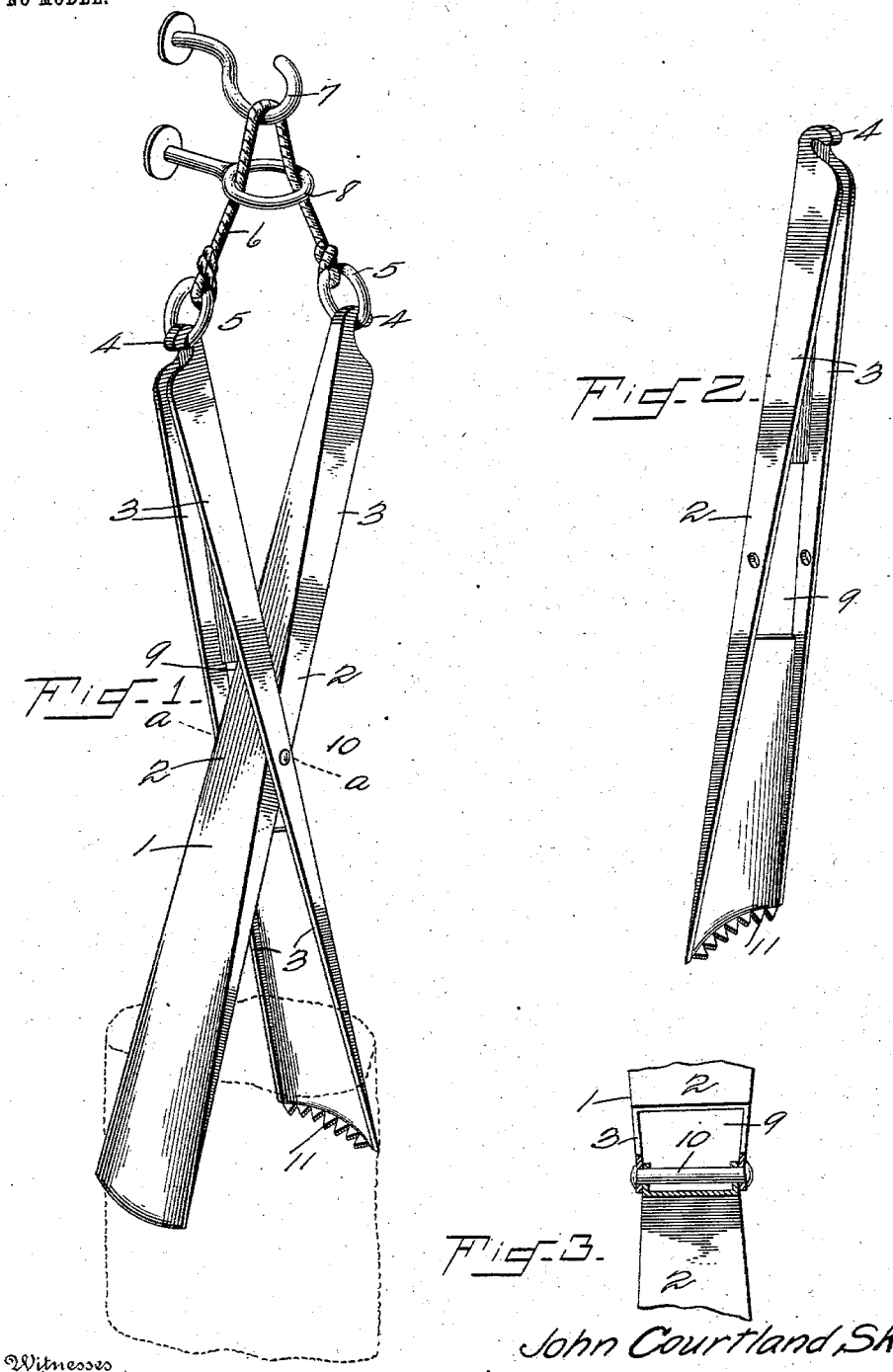
Witnesses
George Hilton
Inventor
John Courtland Skinner,
By H. B. Wilson
Attorney No. 730,408.

Patented June 9, 1903.

UNITED STATES PATENT OFFICE.

JOHN COURTLAND SKINNER, OF FRONTENAC, KANSAS.

BANANA-SWING.

SPECIFICATION forming part of Letters Patent No. 730,408, dated June 9, 1903.

Application filed February 19, 1903. Serial No. 144,148. (No model.)

*To all whom it may concern:*

Be it known that I, JOHN COURTLAND SKINNER, a citizen of the United States, residing at Frontenac, in the county of Crawford and State of Kansas, have invented certain new and useful Improvements in Banana-Swings; and I do declare the following to be a full, clear, and exact description of the invention, such as will enable others skilled in the art to which it appertains to make and use the same.

My invention is an improved banana-swing adapted for use in hanging bunches of bananas with the cut stem up and the smaller bananas at the end of the bunch lowermost and so that the bananas extend upwardly to facilitate the removal of the bananas from the stem when selling the same; and my invention consists in the construction and combination of devices hereinafter described and claimed.

In the accompanying drawings, Figure 1 is a side elevation, partly in section, of a banana-swing embodying my improvements, showing the same attached to the cut-stem portion of a bunch of bananas. Fig. 2 is a detail perspective view of one member of the swing. Fig. 3 is a transverse sectional view taken on the plane indicated by the line *a a* of Fig. 1.

In the embodiment of my invention I provide a pair of clamping-jaws 1, each of which is formed integral with a lever-arm 2—that is to say, the swing comprises a pair of elements, each of which has a jaw and a lever-arm. The said members of my improved banana-swing are made of suitable sheet metal. Each jaw 1 widens downwardly and is provided on its inner side with side flanges 3, which are formed integral therewith and are bent at right angles, or substantially so, with reference to the plane of the jaw, the said side flanges widening upwardly toward the narrow upper end of the jaw, as shown. Said side flanges are also coextensive in length with the lever or arm 2 at the upper end of the jaw and serve also to reinforce and strengthen said lever. The extreme upper end of each lever-arm 2 is turned outwardly to form a hook 4. The said hooks of the respective lever-arms are engaged by rings 5, which are connected together by a suspending-cord 6, which is adapted to be engaged with a hook or other suitable supporting device, as at 7. That portion of the suspending-cord which engages the hook or suspending device may be provided with a ring, as at 8. The arm or lever 2 of one of the members passes through an opening 9 in the other member, so that the said members are disposed in intersecting planes and with their respective side flanges 3 in engagement with one another, and the said members are pivotally connected together by a bolt or other suitable device 10, which passes through openings in their side flanges. The lower portion of each jaw 1 is curved transversely, the radius of the said curve approximating that of a banana-stem, so that the said jaws are adapted to fit on opposite sides of a banana-stem when they are closed thereon, and at the extreme lower ends the said jaws have inturned serrated stem-engaging points 11, which are formed integral therewith and which greatly facilitate and increase the grip of the jaws on the stem of the bunch of bananas.

It will be understood that by reason of the disposition of the members of the swing in intersecting planes and the provision of the upwardly-extended angularly-related lever-arms 2 and the suspending-cord connected to the upper ends thereof the weight of the bunch of bananas causes the said members to act as levers in compressing the jaws against opposite sides of the stem, so that the bunch of bananas may be suspended by the banana-swing, and there is no danger of its becoming casually displaced therefrom.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

1. A banana-swing comprising a pair of members pivotally connected together and angularly disposed, each of said members being formed of a single piece of sheet metal and comprising a jaw, a lever-arm, and having side flanges struck up from the plane of said jaw and lever-arm, and reinforcing the same, substantially as described.

2. A banana-swing comprising a pair of members pivotally connected together and angularly disposed, each of said members being formed of a single piece of sheet metal and comprising a jaw, a lever-arm, and having side flanges struck up from the planes of said jaw and lever-arm, and reinforcing the same, the arm of one of said members being passed through and disposed in an opening with which the arm of the other member is provided, and the side flanges of said members being in engagement with one another at the intersecting pivotal portions of said members, substantially as described.

In testimony whereof I have hereunto set my hand in presence of two subscribing witnesses.

JOHN COURTLAND SKINNER.

Witnesses:
F. M. FALLER,
R. W. GUDGEN.